Oct. 21, 1924.  1,512,610
J. W. KOLB
SANITARY COW STALL
Filed March 22, 1924
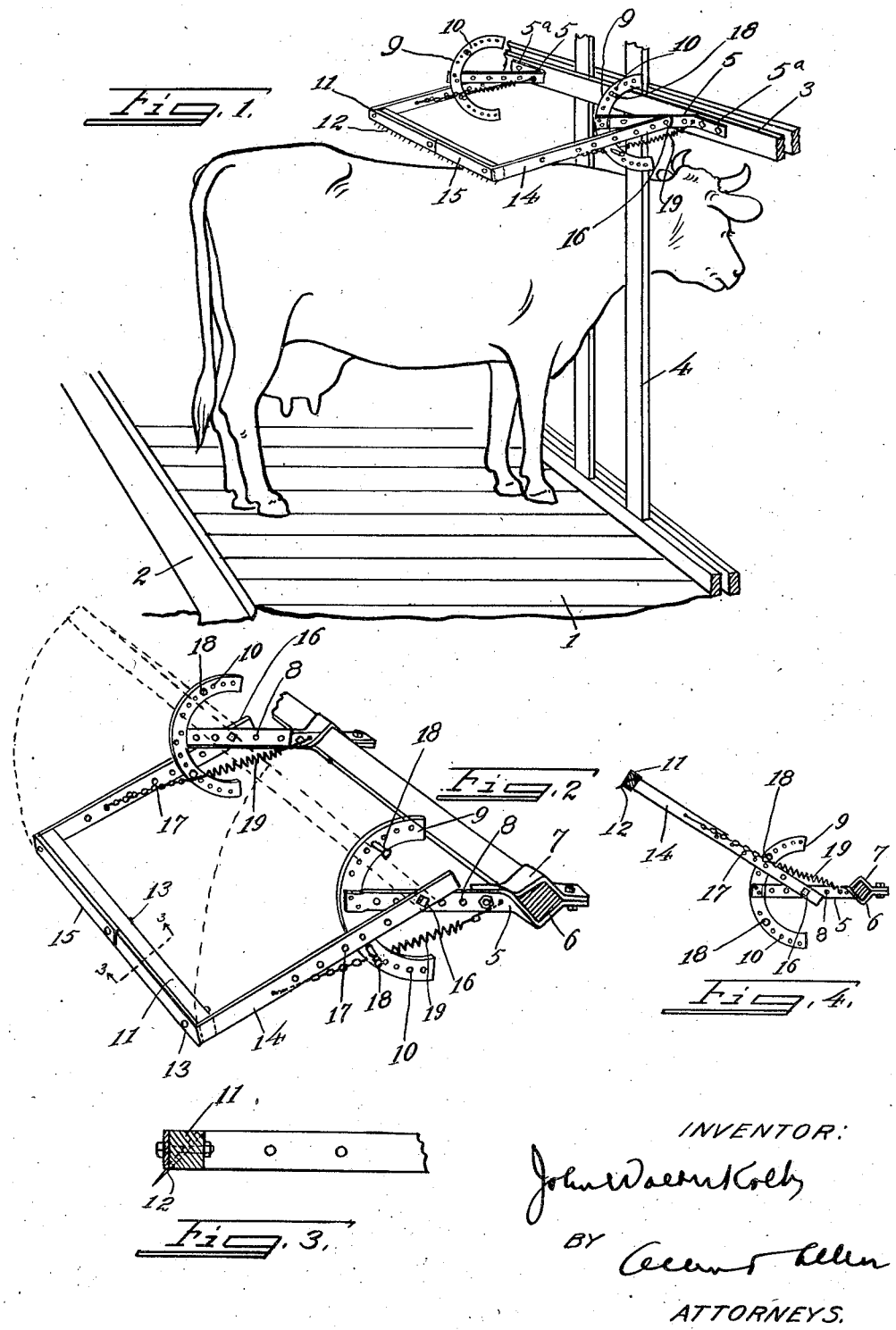
INVENTOR:
John Walter Kolb
BY
ATTORNEYS.

Patented Oct. 21, 1924.

1,512,610

UNITED STATES PATENT OFFICE.

JOHN WALTER KOLB, OF HARRISON, OHIO.

SANITARY COW STALL.

Application filed March 22, 1924. Serial No. 701,040.

*To all whom it may concern:*

Be it known that I, JOHN WALTER KOLB, a citizen of the United States, and a resident of Harrison, in the county of Hamilton and State of Ohio, have invented certain new and useful Improvements in Sanitary Cow Stalls, of which the following is a full, clear, and exact description, reference being had to the accompanying drawing, forming part of this specification.

My invention relates to cow stalls in which provision is made for preserving them in a clean condition.

It is a known fact that where a pointed object is arranged closely above the back of a cow, the animal will not be able to hump up while in the stall until she backs up far enough at the time of humping. As a result stalls may be kept clean from droppings.

The above known fact has been utilized in several instances as a basis for devices to be used in diary barns where cleanliness of the animal, and particularly her udders, is a matter of vital importance. The object of my invention is to improve upon, and render more practical devices for such purpose.

Among other objects I desire to provide a member which is easily and quickly adjustable, and one which can be thrown out of the way readily, and dropped into position, when leading the cow into her stall. My device is easily attachable to the stanchion over the cow's stall and is adjustable both lengthwise and vertically of the stall, so as to take care of animals of different sizes and stall conditions in various barns.

I accomplish my objects by that certain construction and arrangement of parts to be hereinafter more specifically pointed out and claimed.

In the drawing:

Figure 1 is a perspective view of the device in use.

Figure 2 is a perspective of the device on a larger scale.

Figure 3 is a detail section through the pin bar.

Figure 4 is a detail elevation of the mounting arms in their upper position.

The illustration and description that follows have reference to a preferred embodiment of my invention and are not intended as limitations of the invention to the exact details set forth.

The cow stall floor is shown at 1, manure trough at 2, and cross stanchion at 3. In some stalls the cow's head is placed between the uprights 4 between the floor and stanchion.

My device is provided with means for mounting it on the stanchion and dependent upon the kind of stanchion a mounting arm 5 is provided which has a portion thereof bent at right angles and formed into a portion 6 for embracing part of the stanchion. A clamping piece 7 is bolted to the portion 6, thereby completing a clamp about the stanchion for holding the arm in place. There will usually be two arms, with rows of holes 8, extending along their length.

At the ends of the arms are mounted the half circle plates 9, which plates have a series of holes 10 extending throughout their length.

The pin bar is shown as formed of a piece of wood 11, in which are pins 12 arranged in a row extending throughout its length and the bar is bolted by means of bolts 13 into the rocking frame.

This frame is formed of one or more pieces and has the arms 14, 14, and the front bar 15 to which the wooden bar 11 is bolted.

The mounting or pivot bolts 16 for the arms 14 may be set in any one of the series of holes 17 in the arms, and of the series of holes 8 in the arms 5.

The holes in the two half circle plates are used for mounting the stop pins 18. There will be a pin arranged to limit the downward movement of the pin bar frame, by forming a stop against which the arms 14 will contact. There will also be a pin arranged to provide a stop for the upward movement of the frame arms 14.

I provide the helical springs 19, which are secured to the mounting arms 5 and hooked into holes in the arms 14 of the pin bar frame. The result of the springs and the pivoting of the frame arms 14 is that a movement of the frame past alignment with the arms 15 in either direction will result in the springs pulling the frame the rest of the way against the stop pins.

In use the operator will set the pivot bolts and the stop pins at such a point that the frame will lie closely above the proper point on the cow's back to result in pronging the cow with the pins of the pin bar, should she hump up, without backing to a position where the stall will not be soiled.

When the pin bar frame is swung down, as in Figure 2, the humping up of the cow will cause the pins to strike her, but the pins will not penetrate far enough to injure her, because of the resilient mounting of the bar. The humping will not be sufficient, however, to throw the bar frame, past center.

When taking the cow out of the stall the dairyman merely throws up the frame, past center, whereupon it will spring up well beyond any chance contact with the animal, and when the cow is back in her place, he will drop the frame, so as to bring the pins into position, ready to interfere with the cow soiling her stall, by inhibiting the act of humping up.

In the case of a wooden stanchion, the arms 5 may be provided with plates 5ª at their inner ends for screwing to the stanchions as illustrated in Figure 1. Round stanchions, will naturally require drilling a hole in the stanchion, so as to prevent the clamps 6, 7, (Figure 2) from slipping around, by setting a stop pin or set screw into the drilled holes and through the clamps.

The shape of the two half circle plates for the stop pins, permits of ready setting of the pins at any desired elevation for the pin bar frames.

Having thus described my invention, what I claim as new and desire to secure by Letters Patent, is:—

1. A device of the character described, comprising a pin bearing element for preventing humping of a cow, and means for mounting said element comprising a rocking frame on which the element is arranged, adjustable stops for limiting the movements of the frame to its upper and lower positions, and resilient means for holding the frame in its lower and upper stopped positions.

2. A device of the character described, comprising a pin bearing element for preventing humping of a cow, and means for mounting the element comprising supporting arms, pivoting means on the arms, a frame for the pin bearing element pivoted to the arms by said means, stops for limiting the movements of the frame to its upper and lower positions, and spring means secured to the arms at one side of the pivoting means, and to the frame beyond said pivoting means, whereby the springs will act to pull the frame to its upper and lower stopped positions, when said frame is moved past center.

3. A device of the character described, comprising a pin bearing element for preventing humping of a cow, and means for mounting said element comprising a rocking frame on which the element is arranged, adjustable stops for limiting the movements of the frame to its upper and lower positions, and resilient means for holding the frame in its lower and upper stopped positions, said adjustable stops comprising a perforated plate extending in an arc alongside of the frame, and pins located in the perforations in said plate.

4. A device of the character described, comprising a pin bearing element for preventing humping of a cow, and means for mounting the element, comprising supporting arms, pivoting means on the arms, a frame for the pin bearing element pivoted to the arms by said means, stops for limiting the movements of the frame to its upper and lower positions, and spring means secured to the arms at one side of the pivoting means, and to the frame beyond said pivoting means, whereby the springs will act to pull the frame to its upper and lower stopped positions, when said frame is moved past center, said stops comprising a pair of arc shaped plates secured to the supporting arms, and extending to both sides thereof, and holes in the plates, and stop pins in said holes.

JOHN WALTER KOLB.